(12) United States Patent
Ramezani et al.

(10) Patent No.: US 11,314,922 B1
(45) Date of Patent: Apr. 26, 2022

(54) SYSTEM AND METHOD FOR GENERATING REGULATORY CONTENT REQUIREMENT DESCRIPTIONS

(71) Applicant: MOORE & GASPERECZ GLOBAL INC., Vancouver (CA)

(72) Inventors: Mahdi Ramezani, Vancouver (CA); Elijah Solomon Krag, Vancouver (CA); Donya Hamzeian, Toronto (CA); Greg J. Gasperecz, New Orleans, LA (US); Margery Moore, Salt Spring Island (CA)

(73) Assignee: MOORE & GASPERECZ GLOBAL INC., Vancouver (CA)

( * ) Notice: Subject to any disclaimer, the term of this patent is extended or adjusted under 35 U.S.C. 154(b) by 0 days.

(21) Appl. No.: 17/510,647

(22) Filed: Oct. 26, 2021

Related U.S. Application Data

(60) Provisional application No. 63/118,791, filed on Nov. 27, 2020.

(51) Int. Cl.
*G06F 40/30* (2020.01)
*G06N 20/10* (2019.01)
(Continued)

(52) U.S. Cl.
CPC ............ *G06F 40/10* (2020.01); *G06F 40/284* (2020.01); *G06N 3/08* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS 7,571,149 B1 * 8/2009 Yanosy, Jr. ............... G06F 8/10
706/52
7,823,120 B2 10/2010 Kazakov et al.
(Continued)

FOREIGN PATENT DOCUMENTS

CA 2256408 C 12/1997
CA 2381460 A1 2/2001
(Continued)

OTHER PUBLICATIONS

Elwany, E. et al.; "BERT Goes to Law School: Quantifying the Competitive Advantage of Access to Large Legal Corpora in Contract Understanding", arXiv: Computation and Language, 2019, pp. 1-4.
(Continued)

*Primary Examiner* — Lamont M Spooner

(57) ABSTRACT

A computer-implemented method for generating regulatory content requirement descriptions is disclosed and involves receiving requirement data including a plurality of requirements including hierarchical information extracted from regulatory content. The method involves identifying parent requirements based on the existence of child requirements on a lower hierarchical level and generating requirement pairs including the parent requirement and at least one child requirement. The method also involves feeding each of the pairs through a conjunction classifier which has been trained to generate a classification output indicative of the pair being not a conjunction (NC), a single requirement conjunction (CSR), or a multiple requirement conjunction (CMR). The method involves generating a set of requirement descriptions based on the classification output generated for each parent requirement.

30 Claims, 9 Drawing Sheets

| Citation identifier | | | | Requirement text | Final Classification |
|---|---|---|---|---|---|
| 1 | 2 | 3 | 4 | | |
| A. | | | | Do all of the following: | CMR |
| | 1. | | | For equipment Z, comply with a and b below. | CMR |
| | | a. | | Operate only during daylight hours. | |
| | | b. | | Maintain fuel level at greater than 25%. | |
| | 2. | | | For Equipment Y: | CMR |
| | | c. | | Use only natural gas for fuel; | |
| | | d. | | For Equipment Y greater than 500 hp: | CSR |
| | | | i. | Record fuel consumption daily, or | |
| | | | ii. | Install a recording fuel meter. | |
| | | e. | | For Equipment Y less than 500 hp: | CMR |
| | | | iii. | Install catalytic converter, and | |
| | | | iv. | Replace fuel filter monthly. | |
| | 3. | | | For Equipment X, comply with one of the following: | CSR |
| | | f. | | Circulate fluid continuously; | |
| | | g. | | Use an absorbing fluid; | |
| | | h. | | Inspect equipment daily. | |
| | 4. | | | For Equipment W, keep the covers closed at all time. | NC |
| | | i. | | If the power to the unit exceeds 300, you must shut the equipment down within 15 minutes. | |
| | | j. | | If the unit operates below freezing temperature, you must ensure adequate antifreeze in the cooling system. | |

(51) Int. Cl.
  *G06F 40/10* (2020.01)
  *G06N 3/08* (2006.01)
  *G06F 40/284* (2020.01)

(56) References Cited

U.S. PATENT DOCUMENTS

| | | | |
|---|---|---|---|
| 8,156,010 | B2 | 4/2012 | Gopalakrishnan |
| 8,266,184 | B2* | 9/2012 | Liu .................. G06F 8/10 707/802 |
| 8,306,819 | B2 | 11/2012 | Liu et al. |
| 8,447,788 | B2* | 5/2013 | Liu .................. G06F 8/10 707/802 |
| 8,510,345 | B2* | 8/2013 | Liu .................. G06F 8/10 707/802 |
| 8,676,733 | B2 | 3/2014 | Heisele et al. |
| 8,897,563 | B1 | 11/2014 | Welling et al. |
| 10,013,655 | B1 | 7/2018 | Clark |
| 10,516,902 | B1 | 12/2019 | Manoria et al. |
| 10,565,502 | B2 | 2/2020 | Scholtes |
| 10,853,696 | B1 | 12/2020 | Luo et al. |
| 11,005,888 | B2* | 5/2021 | Wang .................. H04L 63/20 |
| 11,080,486 | B2 | 8/2021 | Hao et al. |
| 11,194,784 | B2* | 12/2021 | Brisimi .................. G06N 20/00 |
| 2002/0080196 | A1 | 6/2002 | Bornstein et al. |
| 2004/0039594 | A1* | 2/2004 | Narasimhan ............ G06F 21/10 705/1.1 |
| 2005/0160263 | A1* | 7/2005 | Naizhen .............. G06F 21/6218 713/167 |
| 2005/0188072 | A1* | 8/2005 | Lee ...................... H04L 69/329 709/223 |
| 2005/0198098 | A1* | 9/2005 | Levin ...................... H04L 69/24 709/200 |
| 2007/0226356 | A1* | 9/2007 | Levin .................. H04L 41/0853 709/227 |
| 2008/0216169 | A1* | 9/2008 | Naizhen .............. G06F 21/6218 726/16 |
| 2008/0263505 | A1* | 10/2008 | StClair ................ G06F 11/3692 717/101 |
| 2010/0153473 | A1* | 6/2010 | Gopalan .................... G06F 8/10 707/810 |
| 2010/0228548 | A1 | 9/2010 | Liu et al. |
| 2011/0258182 | A1 | 10/2011 | Singh et al. |
| 2011/0289550 | A1* | 11/2011 | Nakae .................... G06F 21/604 726/1 |
| 2012/0011455 | A1* | 1/2012 | Subramanian .......... G06Q 10/10 715/764 |
| 2016/0350885 | A1* | 12/2016 | Clark .................. G06Q 30/0185 |
| 2017/0264643 | A1* | 9/2017 | Bhuiyan .............. G06F 40/253 |
| 2018/0075554 | A1* | 3/2018 | Clark .................. G06Q 50/18 |
| 2018/0137107 | A1 | 5/2018 | Buccapatnam Tirumala et al. |
| 2018/0197111 | A1 | 7/2018 | Crabtree et al. |
| 2018/0225471 | A1* | 8/2018 | Goyal ...................... G06F 21/62 |
| 2019/0098054 | A1* | 3/2019 | Ramachandran ....... H04L 63/20 |
| 2019/0251397 | A1 | 8/2019 | Tremblay et al. |
| 2019/0377785 | A1 | 12/2019 | N et al. |
| 2020/0004877 | A1* | 1/2020 | Ghafourifar .......... H04L 67/306 |
| 2020/0019767 | A1 | 1/2020 | Porter et al. |
| 2020/0050620 | A1* | 2/2020 | Clark .................... G06F 16/353 |
| 2020/0074515 | A1 | 3/2020 | Ghatage et al. |
| 2020/0082204 | A1 | 3/2020 | Beaver |
| 2020/0111023 | A1 | 4/2020 | Pondicherry Murugappan et al. |
| 2020/0125659 | A1* | 4/2020 | Brisimi .................. G06N 5/025 |
| 2020/0213365 | A1* | 7/2020 | Ramachandran ....... H04L 63/20 |
| 2020/0233862 | A1 | 7/2020 | Shaked et al. |
| 2020/0279271 | A1 | 9/2020 | Gasperecz et al. |
| 2020/0311201 | A1 | 10/2020 | Sainani et al. |
| 2020/0320349 | A1 | 10/2020 | Yu et al. |
| 2020/0349920 | A1 | 11/2020 | Al Bawab et al. |
| 2021/0089767 | A1 | 3/2021 | Ashek et al. |
| 2021/0117621 | A1* | 4/2021 | Sharpe .................... G06F 16/35 |
| 2021/0124800 | A1 | 4/2021 | Williams |
| 2021/0209358 | A1 | 8/2021 | Hao et al. |

FOREIGN PATENT DOCUMENTS

| | | |
|---|---|---|
| CA | 2410881 A1 | 12/2001 |
| CA | 2419377 A1 | 2/2002 |
| CA | 2699397 A1 | 4/2009 |
| CA | 2699644 A1 | 4/2009 |
| CN | 110705223 A | 1/2020 |
| EP | 2993617 A1 | 3/2016 |
| RU | 2628431 C1 | 8/2017 |

OTHER PUBLICATIONS

Lee, J. et al.; "BioBERT: a pre-trained biomedical language representation model for biomedical text mining", Bioinformatics, pp. 2019, 2019.

Nguyen, T. et al.; "Recurrent neural network-based models for recognizing requisite and effectuation parts in legal texts", Springer Science+Business Media B.V., 2018, pp. 169-199.

Chalkidis, I. et al.; "Deep learning in law: early adaptation and legal word embeddings trained on large corpora", Springer Nature B.V. 2018, pp. 171-198.

Tang, G. et al.; "Matching law cases and reference law provision with a neural attention model", 2016, pp. 1-4.

Kingston, J.; "Using artificial intelligence to support compliance with the general data protection regulation", Springer Science+Business Media B.V., 2017 pp. 429-443.

Fatema et al.; "A Semi-Automated Methodology for Extracting Access Control Rules from the European Data Protection Directive", IEE Computer Society, 2016, pp. 25-32.

Mandal, S. et al.; "Modular Norm Models: A Lightweight Approach for Modeling and Reasoning about Legal Compliance", IEE Computer Society, 2017, pp. 657-662.

Hashmi M.; "A Methodology for Extracting Legal Norms from Regulatory Documents", IEEE Computer Society, 2015, pp. 41-50.

Kiyavitskaya, N. et al.; "Automating the Extraction of Rights and Obligations for Regulatory Compliance", Conceptual Modeling, 2008, pp. 154-168.

Islam, M. et al. "RuleRS: a rule-based architecture for decision support systems", Spring Science+Business Media B. V., 2018, pp. 315-344.

Young T. et al., "Recent Trends in Deep Learning Based Natural Language Processing [Review Article]," IEEE Computational Intelligence Magazine, vol. 13, No. 3, pp. 1-32, 2018.

Radford A. et al., "Improving Language Understanding by Generative Pre-Training", pp. 1-12, 2018.

Devlin, J. et al. "BERT: Pre-training of Deep Bidirectional Transformers for Language Understanding", arXiv: Computation and Language, pp. 1-17, 2018.

Lan, Z. et al., "ALBERT: A Lite BERT for Self-Supervised Learning of Language Representations", arXiv: Computation and Language, pp. 1-17, 2019.

Liu, Y. et al., "RoBERTa: A Robustly Optimized BERT Pretraining Approach", arXiv: Computation and Language, pp. 2-13, 2019.

Denk T.I. et al., "BERTgrid: Contextualized Embedding for 2D Document Representation and Understanding.," arXiv: Computation and Language, pp. 1-4, 2019.

Locke, Daniel et al., Automatic cited decision retrieval: Working notes of lelab for FIRE Legal Track Precedence Retrieval Task, Queensland University of Technology, 2017, pp. 1-2.

Locke, Daniel et al., Towards Automatically Classifying Case Law Citation Treatment Using Neural Networks. The University of Queensland, Dec. 2019, pp. 1-8.

Sadeghian, Ali et al., "Automatic Semantic Edge Labeling Over Legal Citation Graphs", Springer Science+Business Media B.V., Mar. 1, 2018, pp. 128-144.

Sanh, V. et al., "DistilBERT, a Distilled Version of BERT: smaller, faster, cheaper and lighter", arXiv: Computation and Language, pp. 1-5, 2019.

Peters, M. E. et al., "To Tune or Not to Tune? Adapting Pretrained Representations to Diverse Tasks", arXiv: Computation and Language, pp. 1-8, 2019.

(56) References Cited

OTHER PUBLICATIONS

Siblini, C. et al., "Multilingual Question Answering from Formatted Text applied to Conversational Agents", arXiv: Computation and Language, pp. 1-10, 2019.

Lai, A. et al., "Natural Language Inference from Multiple Premises", arXiv: Computation and Language, pp. 1-10, 2017.

Katti A. et al.; "Chargrid: Towards Understanding 2D Documents," arXiv: Computation and Language, 2018, pp. 1-11.

Soviany P. et al., "Optimizing the Trade-off between Single-Stage and Two-Stage Object Detectors using Image Difficulty Prediction," arXiv: Computer Vision and Pattern Recognition, pp. 2-6, 2018.

Tsai H. et al., "Small and Practical BERT Models for Sequence Labeling," pp. 9-11, 2019.

Yang X. et al., "Learning to Extract Semantic Structure from Documents Using Multimodal Fully Convolutional Neural Networks," The Pennsylvania State University, pp. 1-16, 2017.

International Search Report and Written Opinion issued by the Canadian Intellectual Property Office in connection with International Patent Application No. PCT/CA2021/051130 dated Nov. 1, 2021, 10 pages.

International Search Report and Written Opinion issued by the Canadian Intellectual Property Office in connection with International Patent Application No. PCT/CA2021/051586 dated Jan. 25, 2022, 10 pages.

International Search Report and Written Opinion issued by the Canadian Intellectual Property Office in connection with International Patent Application No. PCT/CA2021/051585 dated Feb. 16, 2022, 7 pages.

Zhong, Haoxi, et al; "How Does NLP Benefit Legal System: A summary of Legal Artificial Intelligence." arXiv preprint arXiv: 2004.12158v5,2020, pp. 1-13.

Bach, Ngo Xuan, et al.; "Reference Extraction from Vietnamese Legal Documents", Proceedings of the Tenth International Symposium on Information and Communication Technology, 2019, pp. 486-493.

Chalkidis, Ilias et al.; "Extracting Contract Elements", Proceedings of the 16th edition of the International Conference on Artificial Intelligence and Law, 2017, pp. 1-10.

Chalkidis, Ilias et al.; "Obligation and Prohibition Extraction Using Hierarchical RNNs", arXiv preprint arXiv:1805.03871v1, 2018, pp. 1-6.

* cited by examiner

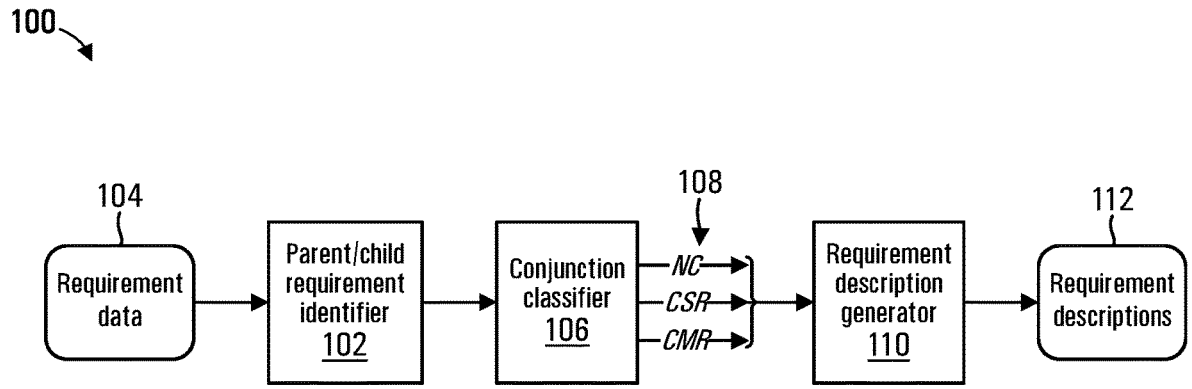

FIG. 1A

| Citation identifier | | | | Requirement text |
|---|---|---|---|---|
| 1 | 2 | 3 | 4 | |
| A. | | | | Do all of the following: |
| | 1. | | | For equipment Z, comply with a and b below. |
| | | a. | | Operate only during daylight hours. |
| | | b. | | Maintain fuel level at greater than 25%. |
| | 2. | | | For Equipment Y: |
| | | c. | | Use only natural gas for fuel; |
| | | d. | | For Equipment Y greater than 500 hp: |
| | | | i. | Record fuel consumption daily, or |
| | | | ii. | Install a recording fuel meter. |
| | | e. | | For Equipment Y less than 500 hp: |
| | | | iii. | Install catalytic converter, and |
| | | | iv. | Replace fuel filter monthly. |
| | 3. | | | For Equipment X, comply with one of the following: |
| | | f. | | Circulate fluid continuously; |
| | | g. | | Use an absorbing fluid; |
| | | h. | | Inspect equipment daily. |
| | 4. | | | For Equipment W, keep the covers closed at all time. |
| | | | i. | If the power to the unit exceeds 300, you must shut the equipment down within 15 minutes. |
| | | | j. | If the unit operates below freezing temperature, you must ensure adequate antifreeze in the cooling system. |

FIG. 1B

| | A | B | C | D |
|---|---|---|---|---|
| 1 | Citation Number | Requirement Text | Classification | Requirement Description |
| 2 | A. | Do all of the following: | RAE | |
| 3 | A.1. | For equipment Z, comply with a and b below: | RAE | |
| 4 | A.1.a. | Operate only during daylight hours. | REQ | Do all of the following: For equipment Z, comply with a and b below: Operate only during daylight hours. |
| 5 | A.1.b. | Maintain fuel level at greater than 25%. | REQ | Do all of the following: For equipment Z, comply with a and b below: Maintain fuel level at greater than 25%. |
| 6 | A.2. | For Equipment Y: | RAE | |
| 7 | A.2.c. | Use only natural gas for fuel; | REQ | Do all of the following: For Equipment Y, Use only natural gas for fuel. |
| 8 | A.2.d. | For Equipment Y greater than 500 hp: | REQ | Do all of the following: For Equipment Y, For Equipment Y greater than 500 hp: Record fuel consumption daily, or Install a recording fuel meter. |
| 9 | A.2.d.i. | Record fuel consumption daily, or | RAE | |
| 10 | A.2.d.ii. | Install a recording fuel meter. | RAE | |
| 11 | A.2.e. | For Equipment Y less than 500 hp: | RAE | |
| 12 | A.2.e.iii. | Install catalytic converter, and | REQ | Do all of the following: For Equipment Y, For Equipment Y less than 500 hp: Install catalytic converter. |
| 13 | A.2.e.iv. | Replace fuel filter monthly. | REQ | Do all of the following: For Equipment Y, For Equipment Y less than 500 hp: Replace fuel filter monthly |
| 14 | A.3. | For Equipment X, comply with one of the following: | REQ | Do all of the following: For Equipment X, comply with one of the following: Circulate fluid continuously, Use an absorbing fluid, Inspect equipment daily |
| 15 | A.3.f. | Circulate fluid continuously; | RAE | |
| 16 | A.3.g. | Use an absorbing fluid; | RAE | |
| 17 | A.3.h. | Inspect equipment daily. | RAE | |
| 18 | A.4. | For Equipment W, keep the covers closed at all time. | REQ | Do all of the following: For Equipment W, keep the covers closed at all time. |
| 19 | A.4.i. | If the power to the unit exceeds 300, you must shut the equipment down within 15 minutes. | REQ | If the power to the unit exceeds 300, you must shut the equipment down within 15 minutes |
| 20 | A.4.j. | If the unit operates below freezing temperature, you must ensure adequate antifreeze in the cooling system. | REQ | If the unit operates below freezing temperature, you must ensure adequate antifreeze in the cooling system |

FIG. 1C

FIG. 6

| Citation identifier 1 2 3 4 | Requirement text | Final Classification |
|---|---|---|
| A. | Do all of the following: | CMR |
| 1. | For equipment Z, comply with a and b below. | CMR |
| a. | Operate only during daylight hours. | |
| b. | Maintain fuel level at greater than 25%. | |
| 2. | For Equipment Y: | CMR |
| c. | Use only natural gas for fuel; | |
| d. | For Equipment Y greater than 500 hp: | CSR |
| i. | Record fuel consumption daily, or | |
| ii. | Install a recording fuel meter. | |
| e. | For Equipment Y less than 500 hp: | CMR |
| iii. | Install catalytic converter, and | |
| iv. | Replace fuel filter monthly. | |
| 3. | For Equipment X, comply with one of the following: | CSR |
| f. | Circulate fluid continuously; | |
| g. | Use an absorbing fluid; | |
| h. | Inspect equipment daily. | |
| 4. | For Equipment W, keep the covers closed at all time. | NC |
| i. | If the power to the unit exceeds 300, you must shut the equipment down within 15 minutes. | |
| j. | If the unit operates below freezing temperature, you must ensure adequate antifreeze in the cooling system. | |

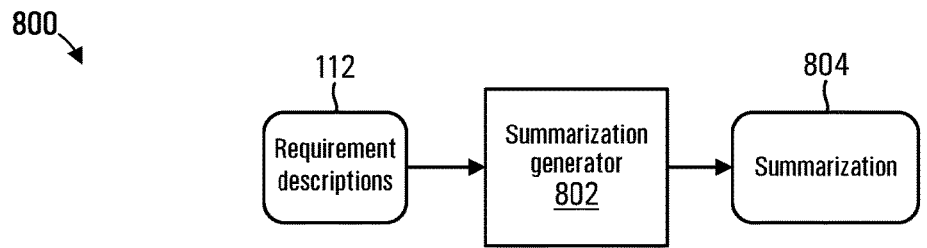

FIG. 8

| Citation Number | Requirement Description | Requirement Summarization |
|---|---|---|
| A. | | |
| A.1. | | |
| A.1.a. | Do all of the following: For equipment Z, comply with a and b below: Operate only during daylight hours. | Do all of the following: For equipment Z, follow the instructions below. |
| A.1.b. | Do all of the following: For equipment Z, comply with a and b below: Maintain fuel level at greater than 25%. | For equipment Z, do all of the following: Maintain fuel level at greater than 25%. |
| A.2. | | |
| A.2.c. | Do all of the following: For Equipment Y, Use only natural gas for fuel. | Do all of the following: Use natural gas for fuel. |
| A.2.d. | Do all of the following: For Equipment Y, For Equipment Y greater than 500 hp: Record fuel consumption daily, or Install a recording fuel meter. | Do all of the following: For equipment Y: Install a recording fuel meter or record fuel consumption daily. |
| A.2.d.i. | | |
| A.2.d.ii. | ... | |
| A.2.e. | | |
| A.2.e.iii. | Do all of the following: For Equipment Y, For Equipment Y less than 500 hp: Install catalytic converter. | Do all of the following: Do all of the following: For equipment Y less than 500 hp: |
| A.2.e.iv. | Do all of the following: For Equipment Y, For Equipment Y less than 500 hp: Replace fuel filter monthly | For equipment less than 500 hp, do the following: Replace fuel filter monthly |
| A.3. | Do all of the following: For Equipment X, comply with one of the following: Circulate fluid continuously, Use an absorbing fluid, Inspect equipment daily | For equipment X, do all of the following: Use an absorbing fluid, Circulate fluid continuously, Inspect equipment daily |
| A.3.f. | | |
| A.3.g. | | |
| A.3.h. | | |
| A.4. | Do all of the following: For Equipment W, keep the covers closed at all time. | Do all of the following: Keep the covers closed at all times. |
| A.4.i. | If the power to the unit exceeds 300, you must shut the equipment down within 15 minutes | If the power to the unit is more than 300, it must be turned off |
| A.4.j. | If the unit operates below freezing temperature, you must ensure adequate antifreeze in the cooling system | If the temperature is below freezing, the cooling system must be turned off. |

FIG. 9

| Requirement Description | T5 | MUSS-lr=0.7 | MUSS-lr=0.9 | Bigbird-PEGASUS |
|---|---|---|---|---|
| Within one hundred and eighty days (180) of the latter of commencement of operation or issuance of this permit, compliance with the conditions contained in this permit shall be demonstrated to the Division. It is the owner or operator's responsibility to self-certify compliance with the conditions. Failure to demonstrate compliance within 180 days may result in revocation of the permit. A self certification form and guidance on how to self-certify compliance as required by this permit may be obtained online at www.colorado.gov/pacific/cdphe/air-permit-self certification. (Regulation Number 3, Part B, Section III.G.2.) | it is the owner or operator's responsibility to self-certify compliance. failure to demonstrate compliance within 180 days may result in revocation | A self certification form and guidance on how to self-certify compliance as required by this permit may be obtained online at www.colorado.gov/pacific/cdphe/air-permit-self certification. Failure to demonstrate compliance within 180 days may result in revocation of the permit. (Regulation Number 3, Part B, Section III.G.2.) | A self certification form and guidance on how to self-certify compliance as required by this permit may be obtained online at www.colorado.gov/pacific/cdphe/air-permit-self certification. Failure to demonstrate compliance within 180 days may result in revocation of the permit. (Regulation Number 3, Part B, Section III.G.2.) The owner or operator of the business shall demonstrate compliance with the conditions within one hundred and eighty days (180) of commencement of operation or issuance of this permit. | This permit requires self certification by the owner or operator of the latter of commencement of operation or issuance of this permit, compliance with the conditions contained in this permit. |

FIG. 10

SYSTEM AND METHOD FOR GENERATING REGULATORY CONTENT REQUIREMENT DESCRIPTIONS

RELATED APPLICATIONS

This application claims the benefit of U.S. patent application Ser. No. 17/093,416 entitled "TASK SPECIFIC PROCESSING OF REGULATORY CONTENT", filed on Nov. 9, 2020 and incorporated herein by reference in its entirety. This application claims the benefit of U.S. provisional patent application 63/118,791 entitled "SYSTEM AND METHOD FOR GENERATING REGULATORY CONTENT REQUIREMENT DESCRIPTIONS", filed on Nov. 27, 2020 and incorporated herein by reference in its entirety.

BACKGROUND

1. Field

This disclosure relates generally to performing computer implemented language processing tasks on regulatory content.

2. Description of Related Art

Governments at all levels generate documents setting out requirements and/or conditions that should be followed for compliance with the applicable rules and regulations. For example, Governments implement regulations, permits, plans, court ordered decrees, and bylaws to regulate commercial, industrial, and other activities considered to be in the public's interest. Standards bodies, companies, and other organizations may also generate documents setting out conditions for product and process compliance. These documents may be broadly referred to as "regulatory content".

Modern enterprises thus operate under an increasing burden of regulation, which has proliferated exponentially in an attempt by regulatory agencies and other governmental bodies to mitigate potential and actual dangers to the public. Documents setting out regulatory content may vary in size, from one page to several hundred pages. As a result, compliance with regulatory content has become increasingly difficult for enterprises. There remains a need for methods and systems that reduce the burden for enterprises in establishing which regulations and conditions in a body of regulatory content are applicable to their operations.

SUMMARY

In accordance with one disclosed aspect there is provided a computer-implemented method for generating regulatory content requirement descriptions. The method involves receiving requirement data including a plurality of requirements extracted from regulatory content, the requirement data including hierarchical information identifying a hierarchical level of each requirement within the plurality of requirements. The method also involves identifying parent requirements within the plurality of requirements based on the existence of one or more child requirements on a hierarchical level immediately below the parent requirement. The method further involves generating requirement pairs, each pair including one of the parent requirements and at least one of the one or more child requirements on the hierarchical level immediately below the parent requirement. The method also involves feeding each of the requirement pairs through a conjunction classifier, the conjunction classifier having been trained to generate a classification output indicative of the requirement pair being one of not a conjunction (NC) between the parent requirement and the child requirement, a single requirement conjunction (CSR) between the parent requirement and the child requirement, or a multiple requirement conjunction (CMR) between the parent requirement and the child requirement. The method also involves generating a set of requirement descriptions based on the final classification generated for each parent requirement.

Generating the requirement pairs may involve generating a single requirement pair for each parent requirement, the single requirement pair including the parent requirement and all of the child requirements on the hierarchical level immediately below the parent requirement.

Generating the requirement pairs may involve generating a plurality of separate requirement pairs for each parent requirement, each separate requirement pair including the parent requirement and one of the one or more child requirements on the hierarchical level immediately below the parent requirement.

The method may involve generating a final classification for each parent requirement based on a combination of the classification outputs for the requirement pairs corresponding to the one or more child requirements on a hierarchical level immediately below the parent requirement.

Generating the final classification for each parent requirement may involve feeding the classification output for each parent requirement through a final classification neural network, the final classification neural network having been trained to generate the final classification based on the combination of the classification outputs for the requirement pairs.

Generating the final classification may involve assigning a final classification to a parent requirement based on the classifications assigned by the conjunction classifier to the requirement pairs associated with the parent requirement on a majority voting basis.

Generating the final classification may involve assigning a CSR classification to the parent requirement when any one of the classification outputs associated with the requirement pairs is assigned a CSR classification, and if none of the classification outputs associated with the requirement pairs is assigned a CSR classification, assigning a CMR classification to the parent requirement when any one of the classification outputs associated with the requirement pairs is assigned a CMR classification, and if none of the classification outputs associated with the requirement pairs is assigned a CSR or CMR classification, assigning a NC classification to the parent requirement.

Generating the set of requirement descriptions may involve, for each parent requirement assigned a NC classification, generating a requirement description that includes text associated only with the parent requirement, for each parent requirement assigned a CSR classification, generating a single requirement description that concatenates text associated with the parent requirement and each of the one or more child requirements at the hierarchical level below the parent requirement, and for each parent requirement assigned a CMR classification, generating a separate requirement description that concatenates text associated with the parent requirement and the text of each of the one or more child requirements at the hierarchical level below the parent requirement.

The method may involve generating a spreadsheet listing the set of requirement descriptions, each requirement description appearing under a requirement description column on a separate row of the spreadsheet, each row further including the associated citation in a citation column.

Generating the spreadsheet listing may further involve for a parent requirement that is assigned a final classification of CSR, including the associated single requirement description on a spreadsheet row associated with the parent requirement, for a parent requirement that is assigned a final classification of CMR including the separate requirement description for each of the one or more child requirements on a spreadsheet row associated with the respective child requirement, and leaving the requirement description column for the spreadsheet row associated with parent requirement empty.

Generating the spreadsheet listing may further involve, generating a label column, the label column including a requirement label (REQ) for each of a parent requirement that is assigned a final classification of CSR a child requirement associated with a parent requirement assigned a final classification of CMR, and a requirement addressed elsewhere (RAE) label for each parent requirement assigned a final classification of CMR.

Receiving the plurality of requirements may involve receiving regulatory content and generating a language embedding output representing the regulatory content, processing the language embedding output to identify citations and associated requirements within the regulatory content, and processing the plurality of citations to determine a hierarchical level for the citation and associated requirement.

The language embedding may be generated using a pre-trained language model, the language model having been fine-tuned using a corpus of unlabeled regulatory content.

The method may further involve, prior to generating regulatory content requirement descriptions, configuring a conjunction classifier neural network to generate the classification output, the conjunction classifier neural network having a plurality of weights and biases set to an initial value, in a training exercise, feeding a training set of requirement pairs through the conjunction classifier, each requirement pair in the training set having a label indicating whether the pair is a NC, CSR, or CMR requirement pair, and based on the classification output by the conjunction classifier neural network for requirement pairs in the training set, optimizing the plurality of weights and biases to successively train the neural network for generation of the classification output.

The method may involve generating a plurality of requirement summarizations, each requirement summarization corresponding to one of the requirement descriptions and summarizing a text content of the requirement description.

Generating the plurality of requirement summarizations may involve feeding each of the requirement descriptions through a summarization generator, the summarization generator being implemented using a summarization generator neural network that has been trained to generate a summarization output based on a text input.

The method may involve fine-tuning the summarization generator neural network using a regulatory content dataset including requirement descriptions and corresponding requirement description summaries.

The method may involve training the summarization generator neural network by identifying requirements in regulatory content, generating training data in which the identified requirements are masked while leaving descriptive text, optional requirements, and recommendations unmasked, training the summarization generator neural network using the training data, fine-tuning the summarization generator neural network using a regulatory content dataset including requirement descriptions and corresponding requirement description summaries.

The corresponding requirement description summaries may be generated by human review of the regulatory content dataset.

The method may involve training the summarization generator neural network by extracting requirements from a plurality of different regulatory content sources to generate a requirement corpus, generating language embeddings for the requirement sentences in the requirement corpus, identifying similar requirement sentences within the requirement corpus that meet a similarity threshold based on their respective language embeddings, for each of the identified similar requirement sentences, generating a control token that is based on attributes of the requirement sentence to generate labeled training samples for training summarization generator neural network.

In accordance with one disclosed aspect there is provided a system for generating regulatory content requirement descriptions. The system includes a parent/child relationship identifier, configured to receive requirement data including a plurality of requirements extracted from regulatory content, the requirement data including hierarchical information identifying a hierarchical level of each requirement within the plurality of requirements. The parent/child relationship identifier is also configured to identify parent requirements within the plurality of requirements based on the existence of one or more child requirements on a hierarchical level immediately below the parent requirement, and to generate requirement pairs, each pair including one of the parent requirements and at least one of the one or more child requirements on the hierarchical level immediately below the parent requirement. The system also includes a conjunction classifier configured to receive each of the requirement pairs, the conjunction classifier having been trained to generate a classification output indicative of the requirement pair being one of not a conjunction (NC) between the parent requirement and the child requirement, a single requirement conjunction (CSR) between the parent requirement and the child requirement, or a multiple requirement conjunction (CMR) between the parent requirement and the child requirement. The system further includes a requirement description generator, configured to generate a set of requirement descriptions based on the classification output generated for each parent requirement.

The parent/child relationship identifier may be configured to generate the requirement pairs by generating a single requirement pair for each parent requirement, the single requirement pair including the parent requirement and all of the child requirements on the hierarchical level immediately below the parent requirement.

The parent/child relationship identifier may be configured to generate the requirement pairs by generating a plurality of separate requirement pairs for each parent requirement, each separate requirement pair including the parent requirement and one of the one or more child requirements on the hierarchical level immediately below the parent requirement.

The requirement description generator may be configured to generate a final classification for each parent requirement based on a combination of the classification outputs for the requirement pairs corresponding to the one or more child requirements on a hierarchical level immediately below the parent requirement.

The requirement description generator may involve a final classification neural network, the final classification neural network having been trained to generate the final classification based on the combination of the classification outputs for the requirement pairs.

The requirement description generator may be configured to generate the final classification by assigning a CSR classification to the parent requirement when any one of the classification outputs associated with the requirement pairs is assigned a CSR classification, and if none of the classification outputs associated with the requirement pairs is assigned a CSR classification, assigning a CMR classification to the parent requirement when any one of the classification outputs associated with the requirement pairs is assigned a CMR classification, and if none of the classification outputs associated with the requirement pairs is assigned a CSR or CMR classification, assigning a NC classification to the parent requirement.

The system may include a summarization generator operably configured to generate a plurality of requirement summarizations, each requirement summarization corresponding to one of the requirement descriptions and summarizing a text content of the requirement description.

The summarization generator may include a summarization generator neural network that has been trained to generate a summarization output based on a text input.

The summarization generator neural network may be trained by identifying requirements in regulatory content, generating training data in which the identified requirements are masked while leaving descriptive text, optional requirements, and recommendations unmasked, training the summarization generator neural network using the training data, fine-tuning the summarization generator neural network using a regulatory content dataset including requirement descriptions and corresponding requirement description summaries.

The summarization generator neural network may be trained by extracting requirements from a plurality of different regulatory content sources to generate a requirement corpus, generating language embeddings for the requirement sentences in the requirement corpus, identifying similar requirement sentences within the requirement corpus that meet a similarity threshold based on their respective language embeddings, for each of the identified similar requirement sentences, generating a control token that is based on attributes of the requirement sentence to generate labeled training samples for training summarization generator neural network.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments,

FIG. 1A is a block diagram of a system for generating regulatory content requirement descriptions according to a first disclosed embodiment;

FIG. 1B is a tabular representation of a requirement input received by the system of FIG. 1A;

FIG. 1C is an example of a requirement description output generated by the system shown in FIG. 1A;

FIG. 6 is a is a tabular representation of a final classification associated with a set of requirements;

FIG. 8 is a block diagram of a system for generating requirement summarizations for requirement descriptions according to another disclosed embodiment;

FIG. 9 is an example of a requirement summarization output generated by the system shown in FIG. 8; and FIG. 10 is an example of a requirement summarization output for various processing models.

DETAILED DESCRIPTION

Figure 2:
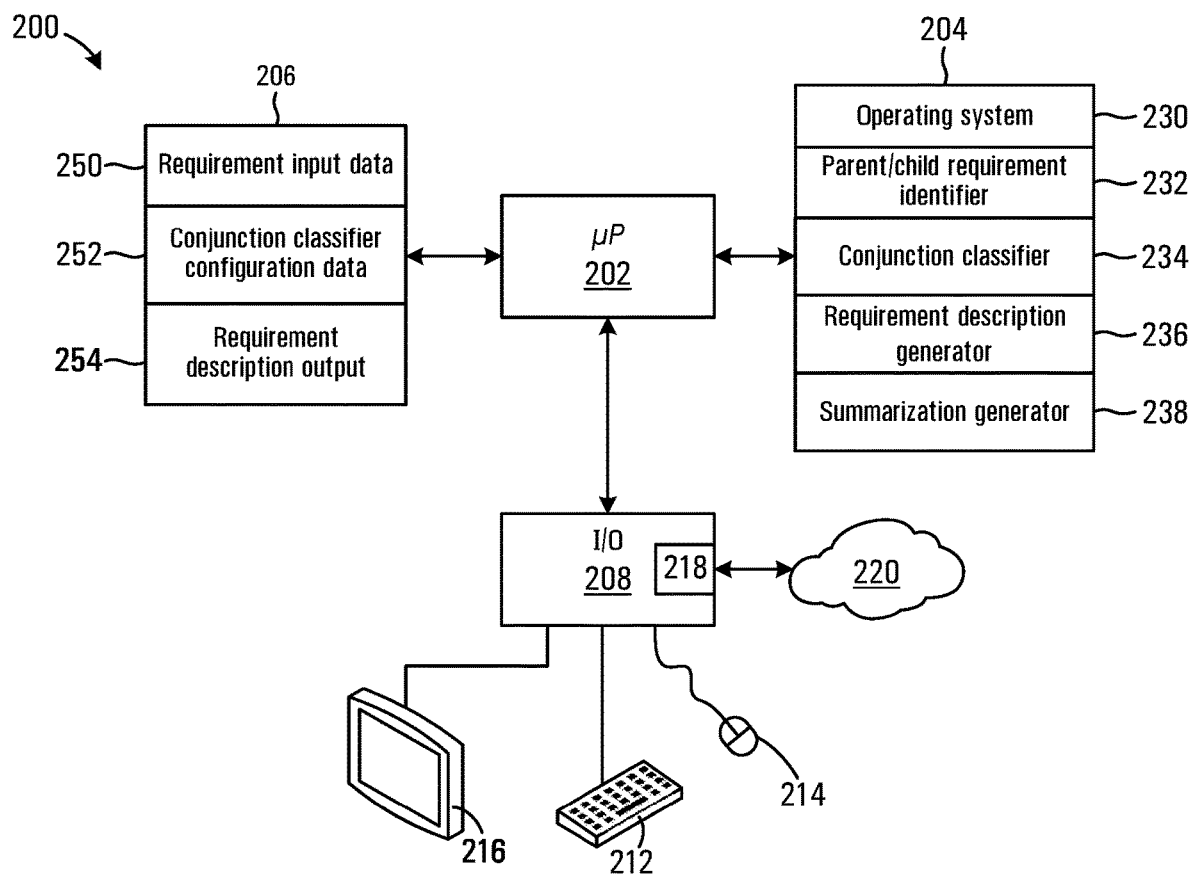
FIG. 2 is a block diagram of an inference processor circuit on which the system shown in FIG. 1A may be implemented.

Referring to FIG. 1A, a system for generating regulatory content requirement descriptions according to a first disclosed embodiment is shown generally at 100 as a block diagram. The system 100 includes a parent/child relationship identifier 102, which receives a requirement data input defining a plurality of requirements 104 extracted from regulatory content. Generally regulatory content documents include significant regulatory text that define requirements, but may also include redundant or superfluous text such as cover pages, a table of contents, a table of figures, page headers, page footers, page numbering etc. In this embodiment the requirement data also includes hierarchical information identifying a hierarchical level of each requirement within the plurality of requirements. Methods and systems for extracting requirements from regulatory content are disclosed in Applicant's commonly owned United States patent application entitled "TASK SPECIFIC PROCESSING OF REGULATORY CONTENT", filed on Nov. 9, 2020, which is incorporated herein by reference in its entirety.

Referring to FIG. 1B, a tabular representation of a requirement input 104 in accordance with one embodiment is shown generally at 120. The requirement input table 120 includes a citation column 122 and a requirement text column 124. Each of the plurality of requirements for the requirement input 104 are listed in the columns on a separate row 126 and include a textual description of the requirement in the requirement text column 124 and the associated citation in the citation column 122. In this embodiment the citation includes alphanumeric characters including sequenced letters, Arabic numerals, and Roman numerals. In the tabular representation 120 the hierarchical level is indicated at 128 by the numbers 1, 2, 3, and 4. The citation identifiers below are aligned with the applicable hierarchical level. As such, the requirement A. is on level 1, requirement 1. is on level 2, etc. Methods and systems for identifying the hierarchical level of requirement citations are disclosed in Applicant's commonly owned U.S. patent application Ser. No. 17/017,406 entitled "METHOD AND SYSTEM FOR IDENTIFYING CITATIONS WITHIN REGULATORY CONTENT" filed on Sep. 10, 2020. which is incorporated herein by reference in its entirety.

In one embodiment the requirement input 104 is received as a data structure that includes the requirement text, citation identifier, and is encoded to convey the hierarchical relationship between requirements. As an example, a JavaScript Object Notation (JSON) file format may be used. A JSON file format provides a nested data structure, which may be used to fully define the hierarchical relationships between requirement in the requirement data input 104.

Referring back to FIG. 1A, the parent/child relationship identifier 102 is configured to identify parent requirements within the plurality of requirements 104 based on the existence of one or more child requirements on a hierarchical level immediately below the parent requirement. In the example above of a JSON input file format, this is easily accomplished by traversing the nested data structure that encodes the hierarchy of the plurality of requirements.

The parent/child relationship identifier 102 is further configured to generate requirement pairs. In one embodiment, each requirement pair includes one of the identified parent requirements and one of the child requirements on the hierarchical level immediately below the parent requirement. As an example, a requirement pair including the requirement text of citation A. and citation 1. on the hierarchical level below A form a first requirement pair. Similarly, requirement text for citations A. and 2., A. and 3., etc. would form further requirement pairs. Some requirements in the plurality of requirements 104 may be child requirements at a hierarchical level under a parent requirement but may also act as parent requirements for other child requirements. For example, the requirement 2. is a child requirement under A. but is also a parent requirement for the requirements c., d., and e.

In other embodiments, each requirement pair for a parent requirement may include all of the child requirements at the hierarchical level below the parent requirement.

The system 100 also includes a conjunction classifier 106 configured to receive each of the requirement pairs from the parent/child relationship identifier 102. The conjunction classifier 106 may be implemented using a neural network that is trained to generate a classification output 108. In this embodiment, the classification output 108 is indicative of the requirement pair being not a conjunction (NC), a single requirement conjunction (CSR), or a multiple requirement conjunction (CMR). In one embodiment the conjunction classifier 106 may generate a classification output having three probability classes corresponding to the classifications NC, CSR, and CMR. Further details of the conjunction classifier 106 are disclosed later herein.

The system 100 further includes a requirement description generator 110, which is configured to generate an output in the form of a set of requirement descriptions 112. The requirement description output 112 is based on the classification generated for the requirement pairs associated with each parent requirement. In some embodiments the requirement description generator 110 may be configured to generate a final classification for each parent requirement prior to generating the requirement descriptions. In one embodiment, the final classification for the parent requirement is based on a combination of the classification outputs for the requirement pairs corresponding to the one or more child requirements on a hierarchical level immediately below the parent requirement.

An example of a requirement description output 112 is shown in FIG. 1C generally at 150. Referring to FIG. 1C, the requirement description output 150 in this embodiment is presented as a spreadsheet including a citation identifier column 152 and a requirement text column 154 for the original requirement text associated with each citation. Columns 152 and 154 generally correspond to the columns of the requirements input table 120 shown in FIG. 1B. The output 150 further includes classification column 156 and a requirement description column 158. The requirement description column 158 includes complete descriptions of requirements extracted from the requirement data input 104. The requirement description generator 110 outputs single, unique requirements in the requirement description column 158 by including text from sections and subsections of the regulatory content. Each requirement is generated to convey a complete thought or definition of the requirement, without the reader having to reference other requirements for full understanding. In this embodiment, each requirement description also has a corresponding classification tag "REQ" in the classification column 156. These classification tags are described in more detail below. The requirement description column 158 also includes a number of empty rows, which have a corresponding classification tag "RAE" in the classification column 156. The RAE tag indicates that the requirement text associated with the citation row does not include a unique requirement. As such, an "RAE" requirement is addressed elsewhere in the requirement description column 158. As an example, the rows A. and A.1. are tagged with the "RAE" classification to indicate that the description of the requirement appears elsewhere (i.e. in this case at citation row A.1.a.).

The requirement description column 158 thus combines requirement text across sections and subsections of a regulatory content document to provide complete and correct requirement descriptions. Since each requirement description in the column 158 is a single unique requirement, this also facilitates generation of a correct count of the number of actual requirements in the regulatory content document. The example of the requirement description output 150 shown in FIG. 1C has four hierarchical levels, but in other embodiments regulatory content may have a number of hierarchical levels that extend to more than four levels.

The system 100 shown in FIG. 1 may be implemented on a processor circuit for performing the processing task on the plurality of requirements 104. Referring to FIG. 2, an inference processor circuit is shown generally at 200. The inference processor circuit 200 includes a microprocessor 202, a program memory 204, a data storage memory 206, and an input output port (I/O) 208, all of which are in communication with the microprocessor 202. Program codes for directing the microprocessor 202 to carry out various functions are stored in the program memory 204, which may be implemented as a random access memory (RAM), flash memory, a hard disk drive (HDD), or a combination thereof.

The program memory 204 includes storage for program codes that are executable by the microprocessor 202 to provide functionality for implementing the various elements of the system 100. In this embodiment, the program memory 204 includes storage for program codes 230 for directing the microprocessor 202 to perform operating system functions. The operating system may be any of a number of available operating systems including, but not limited to, Linux, macOS, Windows, Android, and JavaScript. The program memory 204 also includes storage for program codes 232 for implementing the parent/child requirement identifier 102, program codes 234 for implementing the conjunction classifier 106, and program codes 236 for implementing functions associated with the requirement description generator 110. The program memory 204 further includes storage for program codes 238 for implementing a summarization generator, which is described later herein.

The I/O 208 provides an interface for receiving input via a keyboard 212, pointing device 214. The I/O 208 also includes an interface for generating output on a display 216 and further includes an interface 218 for connecting the processor circuit 200 to a wide area network 220, such as the internet.

The data storage memory 206 may be implemented in RAM memory, flash memory, a hard drive, a solid state drive, or a combination thereof. Alternatively, or additionally the data storage memory 206 may be implemented at least in part as storage accessible via the interface 218 and wide area network 220. In the embodiment shown, the data storage memory 206 provides storage 250 for requirement input data 104, storage 252 for storing configuration data for the conjunction classifier 106, and storage 254 for storing the requirement description output 112.

Figure 3:
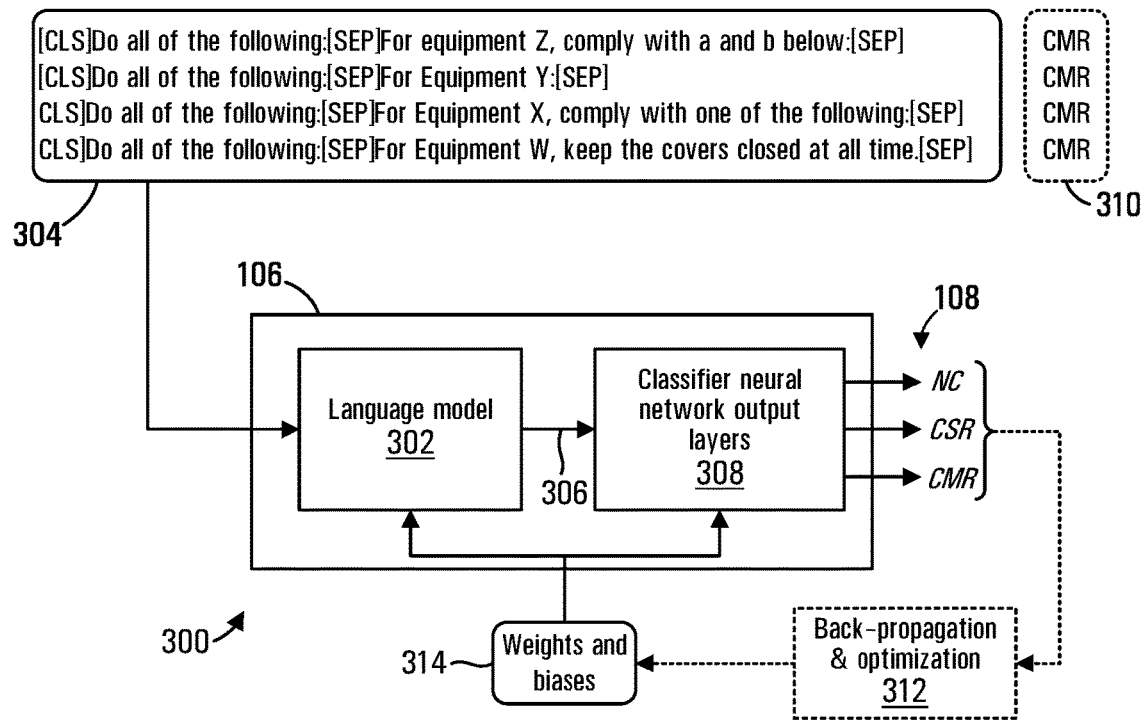
FIG. 3 is a block diagram showing further details of a conjunction classifier of the system shown in FIG. 1A.

Referring to FIG. 3, the conjunction classifier 106 of FIG. 1 is shown in more detail at 300. In this embodiment the conjunction classifier 106 includes a language model 302, which is configured to receive requirement pairs 304. The requirement pair input 304 in the example shown includes combinations of the requirement A in FIG. 2 with each of the child requirements 1, 2, 3, and 4 on a hierarchical level below the parent requirement. In one embodiment the language model 302 may be implemented using a pre-trained language model, such as Google's BERT (Bidirectional Encoder Representations from Transformers) or OpenAI's GPT-3 (Generative Pretrained Transformer). A pre-trained model will have already been trained by the provider and may be used for inference without further training. These language models are implemented using neural networks and may be pre-trained using a large multilingual training corpus (i.e. sets of documents including sentences in context) to capture the semantic and syntactic meaning of words in text. In a Google BERT implementation of the language model 302, for each requirement pair a special token [CLS] is used to denote the start of each requirement text sequence and a special [SEP] token is used to indicate separation between the parent requirement text and the child requirement text and the end of the child requirement text.

The language model 302 generates a language embedding output 306 that provides a representation of the requirement pair input 304. For classification tasks using Google BERT, a final hidden state h associated with the first special token [CLS] is generally taken as the overall representation of the two input sequences. The language embedding output 306 for the BERT language model is a vector W of 768 parameter values associated with the final hidden layer h for the input sequences of parent and child requirements. Language models such as Google BERT may be configured to generate an output based on inputs of two text sequences, such as included in the requirement pair input 304. In this embodiment, the determination being made by the conjunction classifier 106 is whether the text sequences of the requirement pairs are conjunctions. This is a variation of a natural language processing task know as Recognizing Textual Entailment (RTE), where a pair of premise and hypothesis sentences may be classified as being in entailment or not. In this case, the language model is used to output a vector W representative of a conjunction between the parent requirement and child requirement.

In one embodiment the pre-trained language model 302 may be fine-tuned on a regulatory content training corpus to specifically configure the language model 302 to act as a regulatory content language model. The term "corpus" is generally used to refer to a collection of written texts on a particular subject and in this context to more specifically refer to a collection of regulatory content including regulations, permits, plans, court ordered decrees, bylaws, standards, and other such documents. As set out in U.S. Ser. No. 17/093,316 referenced above, a pre-trained language model has a set of determined weights and biases determined for generic content. The language model may be further fine-tuned to improve performance on specific content, such as regulatory content. This involves performing additional training of the language model using a reduced learning rate to make small changes to the weights and biases based on a set of regulatory content data. This process is described in detail in U.S. Ser. No. 17/093,316.

The language embedding output 306 generated by the language model 302 is then fed into a classifier neural network 308, which includes one or more output layers on top of the language model 302 that are configured to generate the classification output 108 based on the vector W representing the conjunction between the requirement text of the parent requirement and the child requirement of the requirement pair. In one embodiment the output layers may include a linear layer that is fully connected to receive the language embedding vector from the language model 302. This linear layer may be followed by a classification layer, such as a softmax layer, that generates the classification output 108 as a set of probabilities.

The language model 302 of the conjunction classifier 106 is initially configured with pre-trained weights and biases (which may have been fine-tuned on regulatory content). The classifier neural network 308 is also configured with an initial set of weights and biases. The weights and biases configure the neural network of the language model 302 and classifier neural network 308 and in FIG. 3 are represented as a block 314. Before using the conjunction classifier 300 to perform inference on the requirement input 104, a training exercise is conducted to train the conjunction classifier 300 for generating the classification output 108. For the training exercise, the requirement pair inputs 304 have assigned labels 310. The labels may be assigned by a human operator for the purposes of the training exercise. In this example, each of the requirement pairs 304 is a conjunction with multiple requirements and is thus assigned the label CMR. In practice, the training samples would include a large number of labeled samples including samples of requirement pairs having the labels NC, CSR, and CMR.

Figure 4:
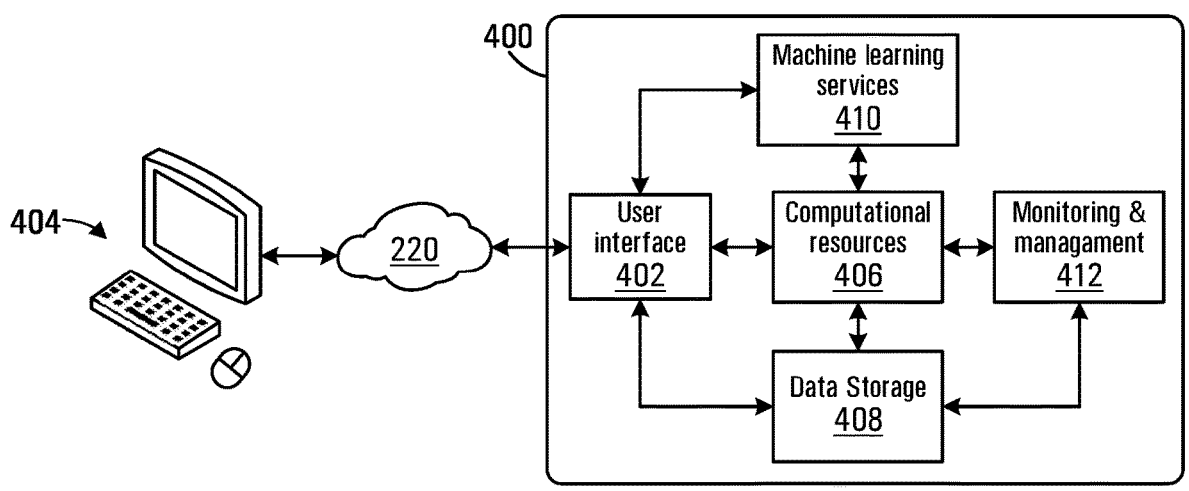
FIG. 4 is a block diagram of a training system for training the conjunction classifier of FIG. 3.

The training exercise may be performed on a conventional processor circuit such as the inference processor circuit 200. However, in practice neural network configuration and training is more commonly performed on a specifically configured training system such as a machine learning computing platform or cloud-based computing system, which may include one or more graphics processing units. An example of a training system is shown in FIG. 4 at 400. The training system 400 includes a user interface 402 that may be accessed via an operator's terminal 404. The operator's terminal 404 may be a processor circuit such as shown at 200 in FIG. 3 that has a connection to the wide area network 220. The operator is able to access computational resources 406 and data storage resources 408 made available in the training system 400 via the user interface 402. In some embodiments, providers of cloud based neural network training systems 400 may make machine learning services 410 that provide a library of functions that may be implemented on the computational resources 406 for performing machine learning functions such as training. For example, a neural network programming environment TensorFlow™ is made available by Google Inc. TensorFlow provides a library of functions and neural network configurations that can be used to configure the above described neural network. The training system 400 also implements monitoring and management functions that monitor and manage performance of the computational resources 406 and the data storage 408. In other embodiments, the functions provided by the training system 400 may be implemented on a stand-alone computing platform configured to provide adequate computing resources for performing the training.

The training process described above addresses a problem associated with large neural network implemented systems. For the training of the system to be completed in a reasonable time, very powerful computing systems such as the training system 400 may need to be employed. However, once the neural network is trained the trained model may effectively be run on a computing system (such as shown at 200 in FIG. 2) that has far more limited resources. This has the advantage that a user wishing to process regulatory content need not have access to powerful and/or expensive computing resources but may perform the processing on conventional computing systems.

Generally, the training of the neural networks for implementing the language model 302 and the classifier neural network 308 are performed under supervision of an operator using the training system 400. In other embodiments the training process may be unsupervised or only partly supervised by an operator. During the training exercise, the operator may make changes to the training parameters and the configuration of the neural networks until a satisfactory accuracy and performance is achieved. The resulting neural network configuration and determined weights and biases 314 may then be saved to the location 252 of the data storage memory 206 for the inference processor circuit 200. As such, the conjunction classifier 106 may be initially implemented, configured, and trained on the training system 400, before being configured for regular use on the inference processor circuit 200.

Referring back to FIG. 3, during the training exercise, the classification output 108 generated by the classifier neural network 308 is fed through a back-propagation and optimization block 312, which adjusts the weights and biases 314 of the classifier neural network 308 from the initial values. In some embodiments, the weights and biases 314 of the language model 302 may be further fine-tuned based on the training samples to provide improved performance of the conjunction classifier 106 for classifying requirement pair inputs 304. This process is described in the above referenced U.S. patent application Ser. No. 17/093,316. When a satisfactory performance of the conjunction classifier 106 has been reached during training, the determined weights and biases 314 may be written to the location 252 of the data storage memory 206 of the inference processor circuit 200. The conjunction classifier 106 may then be configured and implemented on the inference processor circuit 200 for generating conjunction classifications NC, CSR, and CMR for unlabeled requirement pair inputs 304 associated with regulatory content being processed. Note that when performing inference for regulatory content on the inference processor circuit 200, the back-propagation and optimization block 312 and the assigned labels 310 are not used, as these elements are only required during the training exercise.

Referring back to FIG. 1A, the requirement description generator 110 receives the classifications NC, CSR, and CMR assigned by the conjunction classifier 106. The received classifications are applicable to each requirement pair, but do not provide a final classification for the parent requirement. In cases where there is more than one child requirement associated with a parent requirement, the requirement pairs may have different assigned classifications and a final classification for the parent requirement still needs to be determined based on the combination of the classifications for the respective requirement pairs.

Figure 5:
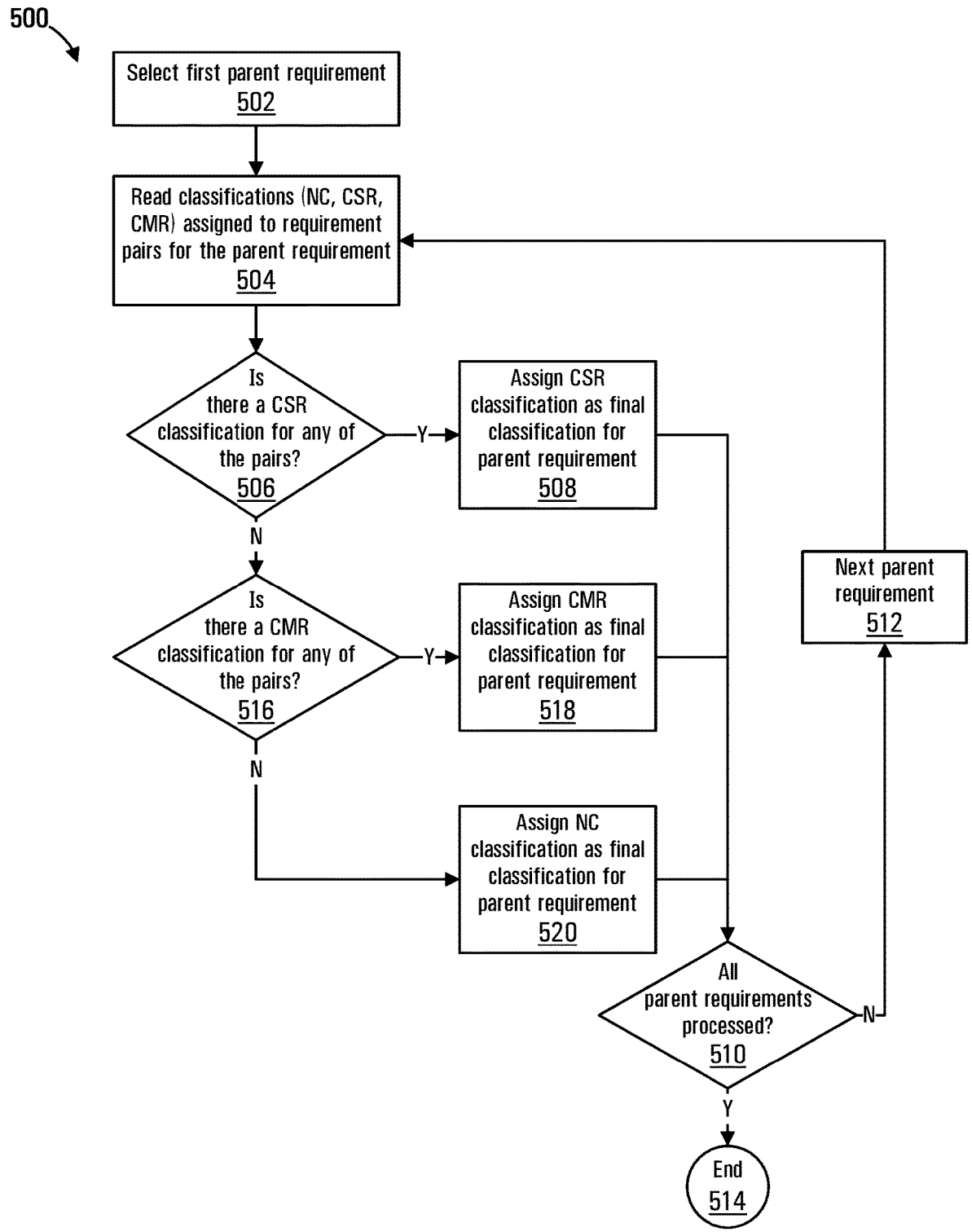
FIG. 5 is a process flowchart including blocks of codes for directing the inference processor circuit of FIG. 2 to assign a final classification to requirement description pairs.

Referring to FIG. 5, a process implemented by the requirement description generator 110 of FIG. 1 for generating a final classification for a parent requirement is shown as a process flowchart at 500. The blocks of the final classification process 500 generally represent codes stored in the requirement description generator location 236 of program memory 204, which direct the microprocessor 202 to perform functions related to generation of requirement descriptions based on the requirements input 104. The actual code to implement each block may be written in any suitable program language, such as C, C++, C#, Java, and/or assembly code, for example.

The process begins at block 502, which directs the microprocessor 202 to select a first parent requirement in the plurality of requirements 104. Block 504 then directs the microprocessor 202 to read the classifications assigned to the requirement pairs for the parent requirement.

The process 500 then continues at block 506, which directs the microprocessor 202 to determine whether any one of the requirement pairs has a CSR classification. If any of the requirement pairs have a CSR classification, the microprocessor 202 is directed to block 508, where the CSR classification is assigned as the final classification for the parent requirement. Referring to FIG. 6, the table of FIG. 1A is reproduced at 600 along with a final classification column 602 to illustrate the output of the final classification process 500. In practice, the assigned final classifications may be written to a JSON file, similar to that described above in connection with the requirement input 104. Block 508 thus directs the microprocessor 202 to write the final classification to the final classification column 602 of the table 600.

In the example of the parent requirement citation d., the conjunction classifier 106 would assign the following two classifications for the pairs (A.2.d., A.2.d.i.) and (A.2.d, A.2.d.ii.):

(A.2.d, A.2.d.i.): (For Equipment Y greater than 500 hp, Record fuel consumption daily, or)→CSR (A.2.d, A.2.d.ii.): (For Equipment Y greater than 500 hp, Install a recording fuel meter)→CMR Although the text "For Equipment Y greater than 500 hp:" is not clearly indicative of a single requirement parent, the child requirement pair (A.2.d, A.2.d.i.) includes the word "or" which would indicate iii. and iv. to be a single requirement (CSR). In the process 500, the CSR classification is prioritized over other CMR and NC classifications and the parent requirement A.2.d is thus classified as CSR parent.

The process then continues at block 510, which directs the microprocessor 202 to determine whether further parent requirements remain to be processed, in which case the microprocessor is directed to block 512. Block 512 directs the microprocessor 202 to select the next parent requirement for processing and directs the microprocessor back to block 504. If at block 510, all of the parent requirements have been processed, the microprocessor 202 is directed to block 514 where the process ends.

If at block 506, none of the requirement pairs have an assigned CSR classification, the microprocessor 202 is directed to block 516. Block 516 directs the microprocessor 202 to determine whether any of the requirement pairs have been assigned a CMR classification by the conjunction classifier 300. If any of the requirement pairs have a CMR classification, the microprocessor 202 is directed to block 518, where the CMR classification is assigned as the final classification for the parent requirement. Block 518 also directs the microprocessor 202 to write the final classification to the final classification column 602 of the table 600. The process then continues at block 510 as described above.

As an example, for the citation A., the final classification is based on the following four classifications of requirement pairs for the combination of A. with 1., 2., 3., and 4. respectively:

(A, 1): (Do all of the following: For equipment Z, comply with a and b below.)→CMR
(A, 2): (Do all of the following: For Equipment Y:)→CMR
(A, 3): (Do all of the following: For Equipment X, comply with one of the following:)→CMR
(A, 4): (Do all of the following: For Equipment W, keep the covers closed at all time.)→CMR It should be noted that in the example above, it is the combination of the requirement text of the parent and the child that is being classified by the conjunction classifier 106. In this case, the conjunction classifier 106 would have been trained during the training exercise to recognize the text "Do all of the following:" as being strongly indicative of a conjunction with multiple requirements (CMR). Since the requirement pairs for citation A. are assigned a CMR classification, the parent requirement A. is assigned a final classification of CMR at block 518. For the example of the parent requirement citation e., the text "For Equipment Y less than 500 hp:" is not clearly indicative of a multiple requirement parent. However, the child requirement pair iii. includes the word "and" and neither of the pairs iii. or iv. include text such as "or", or "any one of" that would indicate iii. and iv. to be a single requirement (CSR). The parent requirement e. is thus assigned a CMR classification by the conjunction classifier 106.

If at block 516, none of the requirement pairs associated with the parent requirement have a CMR classification assigned, then the pairs must have a classification of NC. In this case, block 516 directs the microprocessor 202 to block 520, where the NC classification is assigned as the final classification for the parent requirement. Block 520 also directs the microprocessor 202 to write the final classification to the final classification column 602 of the table 600. The process then continues at block 510 as described above.

Further, for the citation 4., the text "For Equipment W, keep the covers closed at all time." would be classified by the conjunction classifier 106 as not being a conjunction (NC), since the parent requirement is complete on its own, and the two requirement pairs (A.4.i.) and (A.4.j.) at the apparent hierarchical level below the requirement would not indicate otherwise.

Following execution of the process 500, the conjunction classifier 106 will have assigned a classification to each parent requirement as shown in FIG. 1B at 126. It should be noted that final classifications are not assigned to child requirements that are not themselves parent requirements for other child requirements, since a child requirement on its own need only be evaluated in the context of its immediate parent requirement.

In the above described final classification process 500, separate requirement pairs are generated for each parent requirement. As such, each separate requirement pair includes the parent requirement and one of the one or more child requirements on the hierarchical level immediately below the parent requirement.

The conjunction classifier 106 may thus assign different classifications NC, CSR, and CMR to the separate requirement pairs. The final classification process 500 thus resolves these potentially disparate classifications.

In other embodiments, the final classification may be assigned on a majority voting basis in which a majority classification for the requirement pairs is taken as the final classification for the parent requirement. If no majority is present, heuristics may be used to resolve the final classification, such as giving priority to the CSR classification as described above.

In other embodiments, a single requirement pair may be generated for each parent requirement, the single requirement pair including the parent requirement and all of the child requirements on the hierarchical level immediately below the parent requirement. The conjunction classifier 106 may also be trained using similar training pairs, at least some of which may include multiple child requirements and an assigned classification label. In this embodiment the output classification generated by the conjunction classifier 106 is essentially a final classification and the final classification process 500 is omitted. One practical limitation of this approach is that typical language models 302 have a limitation on the number of words that can be processed. For Google BERT, this limitation is 512 words or tokens. If there are too many child requirements under a parent requirement, the language model 302 may not be able to process all of the child requirements under a parent requirement as a single requirement pair.

In an alternative embodiment, an additional final classifier may be implemented and trained to generate a final classification based on the classifications assigned by the conjunction classifier 106 to the requirement pairs. The final classifier may be trained using labeled training samples that include child requirements along with assigned labels.

Figure 7:
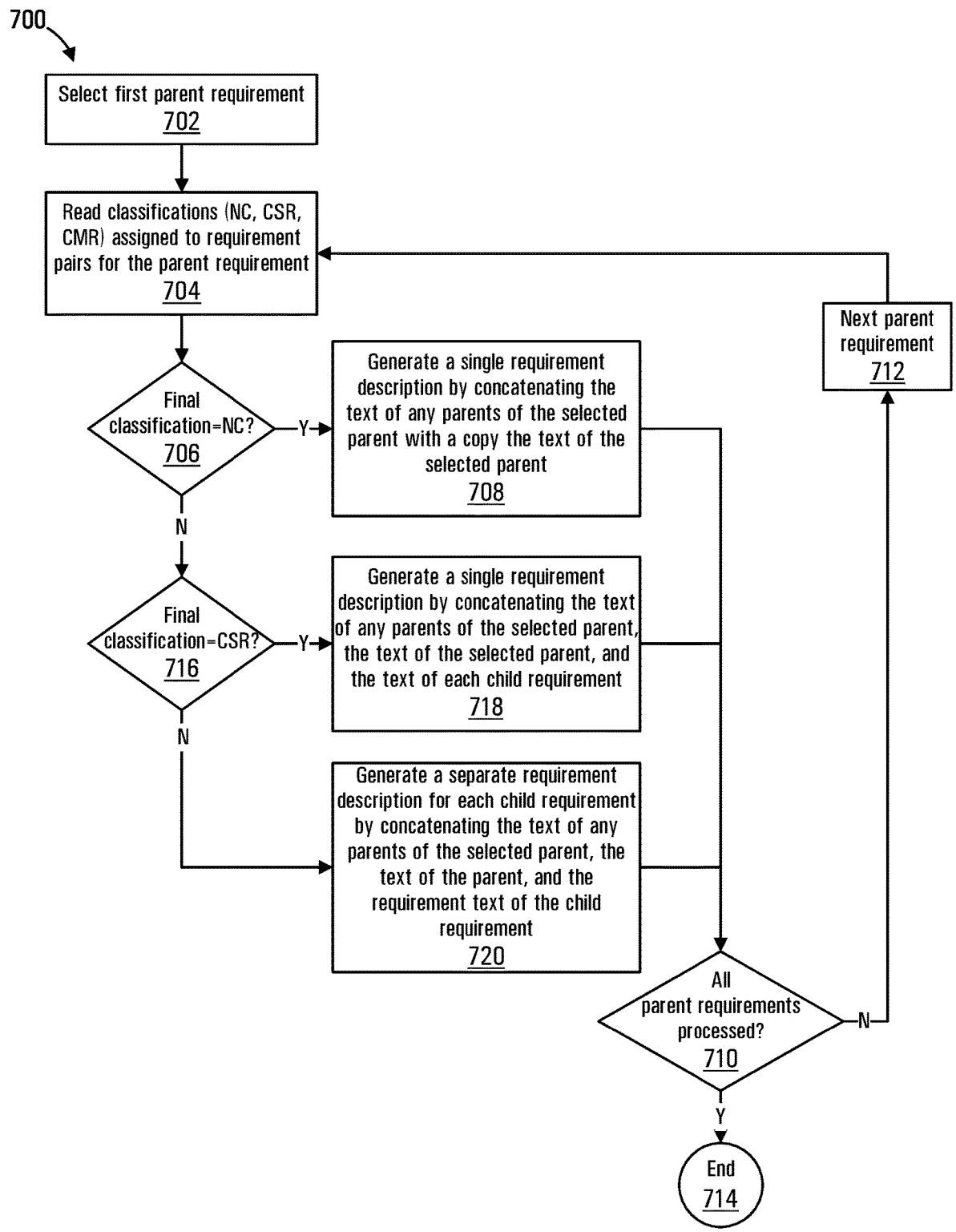
FIG. 7 is a process flowchart including blocks of codes for directing the inference processor circuit of FIG. 2 to generate requirement descriptions for the requirement input shown in FIG. 1A.

The final classification process 500 performed by the requirement description generator 110 provides the necessary information for generation of requirement descriptions, based on the assigned classifications for each patent requirement as shown in the final classification column 602 in FIG. 6. The requirement description output shown at 150 in FIG. 1C is generated based on the final classification NC, CSR, CMR generated for each parent requirement. Referring to FIG. 7, a requirement description generation process implemented by the requirement description generator 110 is shown as a process flowchart at 700. The process 700 begins at block 702, which directs the microprocessor 202 to select the first parent requirement. Block 704 then directs the microprocessor 202 to read the final classification that was assigned to the selected parent requirement during the final classification process 500. The process 700 then continues at block 706, which directs the microprocessor 202 to determine whether the final classification for the parent requirement is NC. If the final classification is NC, block 706 directs the microprocessor 202 to block 708. Block 708 directs the microprocessor 202 to generate the requirement description by concatenating the text of any parents of the selected parent requirement with a copy of the requirement text of the selected parent requirement to the requirement description. The requirement descriptions may be written to the location 254 of the data storage memory 206 of the inference processor circuit 200. In one embodiment the output is written as a row in a spreadsheet format, such as an Excel spreadsheet file or any other delimited text file, such as a comma-separated value (CSV) file. In the output embodiment 150 shown in FIG. 1C, the requirement description is written to a row under the requirement description column 158. The citation number is also written to the same row under the citation identifier column 152. In the embodiment shown, the original requirement text is written to the same row under the requirement text column 154. Additionally, a REQ classification tag is generated and written to the row under the classification column 156. The classification tag REQ indicates that the requirement description column 158 at this row includes a separate unique requirement. An example of a requirement generated by block 708 appears in the row identified by the citation number A.4. in FIG. 1C. This requirement description in column 158 includes the text of the parent requirement A., which is concatenated with the text of the parent requirement A.4.

Block 708 then directs the microprocessor 202 to block 710. The process then continues at block 710, which directs the microprocessor 202 to determine whether further parent requirements remain to be processed, in which case the microprocessor is directed to block 712. Block 712 directs the microprocessor 202 to select the next parent requirement for processing and directs the microprocessor back to block 704. If at block 710, all of the parent requirements have been processed, the microprocessor 202 is directed to block 714 where the process ends.

If at block 706, the final classification read at block 704 is not a NC classification, block 706 directs the microprocessor 202 to block 716. Block 716 directs the microprocessor 202 to determine whether the final classification for the parent requirement is a CSR requirement, in which case the microprocessor is directed to block 718. Block 718 directs the microprocessor 202 to generate a single requirement description for the parent requirement that merges or concatenates the text of any parents of the selected parent requirement, the text of the selected parent requirement, and the text of the child requirements under the selected parent requirement. The row of the requirement description output 150 for this CSR requirement has the requirement description written alongside the parent citation. An example of a requirement generated by block 718 appears alongside citation A.2.d. in FIG. 1C. The classification under the classification column 156 is written as REQ, indicating that this is a single unique requirement. The child requirements under the parent requirement A.2.d. (i.e. A.2.d.i. and A.2.d.ii.) include rows that have entries for the citation number and the requirement text. However, the requirement description 158 is left empty and the classification 156 is written as RAE, indicative of a requirement that is addressed elsewhere in the requirement description column. Block 718 then directs the microprocessor 202 to block 710, and the process continues as described above.

If at block 716, the microprocessor 202 determines that the final classification is not a CSR classification then the final classification must be a CMR classification, and block 716 directs the microprocessor 202 to block 720. Block 720 then directs the microprocessor 202 to generate a separate requirement for each child requirement under the parent requirement, based on the CMR final classification of the parent. This involves concatenating the requirement text of any parents of the selected parent requirement, the text of the parent requirement, and the text of the child requirement. An example of the separate requirements generated by block 720 appears alongside citations A.1.a. and A.1.b. in FIG. 1C. A first requirement description is thus written to the requirement description output 150 on a row alongside the child requirement citation A.1.a and includes the concatenated requirement text of the parent requirements A. and A.1. further concatenated with the text of the child requirement A.1.a. A second requirement description is written to the requirement description output 150 on a row alongside the child requirement citation A.1.b and includes the concatenated requirement text of the parent requirements A. and A.1. further concatenated with the text of the child requirement A.1.b. Each separate requirement thus appears alongside the citation number for the child requirement and is classified as REQ in the classification column 156. The parent requirement appears on the row above but has no requirement description entry in the requirement description column 158 and has a classification of RAE. Block 720 then directs the microprocessor to block 710, and the process continues as described above in connection with blocks 710-714.

The requirement description output 150 shown in FIG. 1C thus represents a set of unique requirements each described in full by the entries in the requirement description column 158. Presenting complete unique requirements as shown and described above has the advantage for a party seeking to comply with the provisions. For example, the party would be easily able to monitor compliance on a requirement by requirement basis in the requirement description output 150 without having to review and understand the original regulatory content.

In another embodiment the system 100 may be augmented to include a summarization function. Referring to FIG. 8, an embodiment of a system 800 is shown generally at 800 and includes a summarization generator 802. The summarization generator 802 receives as an input the requirement description output 112 generated by the requirement description generator 110 of the system 100 shown in FIG. 1A.

Text Summarization is a natural language processing task that has the goal of providing a coherent summary of a passage of text, which is generally shorter than the original passage but still conveys the information contained in the passage. In the example of the requirement description outputs shown in column 158 of FIG. 1C, the requirement descriptions include some awkward phrasing and may also include some repetition of phrases. In this embodiment these issues are addressed by generating a summarization output 804 that include requirement summarizations based on the requirement descriptions that are shorter and/or have improved readability. There are two main approaches to the summarization problem. In an extractive approach, the most important phrases and sentences are selected from the original text and are then combined to generate the summary. The words and phrases in the summarized text are thus taken from the original text. A more complex abstractive approach attempts to do what a human would, i.e. produce a summary that preserves the meaning but does not necessarily use the same words and phrases in the original text.

Various natural language processing models such as T5, BART, BERT, GPT-2, XLNet, and BigBird-PEGASUS provide functions that may be configured to perform abstractive text summarization. These models are implemented using neural networks that are trained to generate a summarized passage based on an input passage. The BigBird-PEGASUS model is pre-trained on a BigPatent dataset, which includes 1.3 million records of U.S. patent documents. The US patent documents conveniently include human written abstracts that can be used as summaries for the purpose of training. The BigBird-PEGASUS model has been found by the inventors to provide a summarization of some requirement descriptions that is easily readable by a layperson.

A T5 model (Text-To-Text Transfer Transformer) may be used for any of a plurality of tasks such as machine translation, question answering, classification tasks, and text summarization. The T5 model receives a text string and generates a text output having information that depends on which one of the plurality of tasks the neural network is configured to perform. The T5 model is pre-trained on a dataset that includes a text summarization dataset based on news sources (i.e. the CNN/Daily Mail dataset). While T5 is pre-trained on news data, the T5 model can also generalize to legal and other contexts and may provide a reasonable summarization result for regulatory text. In some embodiments the T5 model may be used in the already trained state without further training on regulatory content. In other embodiments the pre-trained T5 model may be further enhanced by fine-tuning the model on regulatory text data such as Environmental Health & Safety (EHS) regulatory text. The fine-tuned model may provide enhanced performance when summarizing regulatory text. The fine tuning may be performed on the training system 400 and implemented generally as described above for the pre-trained language model 302 shown in FIG. 3.

In other regulatory content processing embodiments improved performance may be obtained by training the summarization generator 802 on regulatory content rather than using a one of the available pre-trained models. This presents a challenge due to the lack of a sufficiently large dataset of summarized regulatory content, which would be extremely time consuming to generate manually. The Big-Bird-PEGASUS natural language processing model is commonly pre-trained using a dataset in which several important sentences are masked or removed from documents and the model is tasked with recovering these sentences during training. This avoids the need for a large human-labeled training set. The inventors have recognized that in the context of regulatory content the most important sentences are the requirement sentences.

In one embodiment, requirements within regulatory content may be identified using a requirement extraction system. One suitable requirement extraction system is described in commonly owned U.S. patent application Ser. No. 17/093,416 filed on Nov. 9, 2020 and entitled "TASK SPECIFIC PROCESSING OF REGULATORY CONTENT", which is hereby incorporated in its entirety. The disclosed requirement extraction system includes a requirement classifier that is configured to generate a classification. The classification produces a probability that a sentence input to the requirement extraction system is a requirement rather than being descriptive text or a recommendation. Requirements may be identified within regulatory content using the requirement extraction system and then masked. This leaves descriptive content, optional requirements, and recommendations as unmasked content. The training then proceeds on the basis of having the summarization generator 802 neural network recover the masked requirements based on the remaining unmasked content. In this manner a relatively large corpus of regulatory content specific training data may be generated without significant human intervention for training the summarization generator 802. The use of regulatory content in training the summarization generator 802 has the advantage of configuring the summarization generator for specific operation on regulatory content rather then general text such as technical papers or news stories.

This training step may be followed by a fine tuning step in which the model is further trained using human-generated training samples. These training samples may include regulatory content summaries written by people who are familiar with the nature and context of regulatory content. The fine tuning may be performed based on much smaller number of human summarized samples. For example, while the training may involve millions of regulatory content samples, the fine tuning may be performed using in the region of 1000 human summarized training samples. The fine-tuned model may be verified under these conditions to provide an improved performance for regulatory content summarization.

In an alternative training embodiment, a text simplification model may be implemented. Text simplification is a task in Natural Language Processing (NLP) that involves the use of lexical replacements, sentence splitting, and phrase deletion or compression to generate shorter and more easily understood sentences. One such example is Multilingual Unsupervised Sentence Simplification (MUSS). The MUSS model is trained using training data generated without human intervention.

In this alternative regulatory content specific training embodiment, a large body of different regulatory content sources such as permits, federal and provincial regulations, etc. is assembled. The inventors have recognized that in such a large body of regulatory content sources, similar requirements may exist in different sources expressed using different levels of complexity. A requirement corpus is then generated by extracting requirements from the body of regulatory content sources using a requirement extraction system. In one embodiment the requirement extraction may be implemented as described in U.S. patent application Ser. No. 17/093,416 referenced above. The body of regulatory content sources may be processed using the disclosed requirement extraction system to identify and extract probable requirements from descriptive content and optional requirements, thereby generating a requirement corpus.

In a further processing step, language embeddings are then generated for requirements in the requirement corpus. The language embeddings may be generated as described above in connection with the language model 302 of FIG. 3. Each requirement in the requirement corpus is thus represented by a language embedding vector. Subsequently, similar requirement sentences within the requirement corpus may be identified based on similarities between language embedding vectors meeting a similarity threshold. The similarity threshold may be selected to identify requirements that are expressed in different terms and with differing level of complexity, while having a similar meaning based on their respective language embedding vectors.

Finally a control token is generated for each requirement sentence in a group of identified similar requirement sentences. The control token is generated to quantify a level of complexity, length, or some other summarization aspect for the sentence. As an example, in a text simplification model such as Multilingual Unsupervised Sentence Simplification (MUSS), set of nearest neighbor sequences are annotated based on attributes of the sentences. One such attribute is character length ratio, which is the number of characters in the paraphrase divided by the number of characters in the query sentence. Other possible attributes that may be used include replace-only Levenshtein similarity, aggregated word frequency ratio, and dependency tree depth ratio. Similar attributes may be used for generating control tokens for the identified similar requirement sentences in the above-described context of regulatory content. The control tokens based on a selected attribute are associated with the respective requirement sentences in the group of identified similar requirement sentences, which provides a set of training samples for training the summarization generator 802. Further training samples may be generated for other groups of identified similar requirement sentences to generate a large training corpus based on regulatory content.

An example of an output based on some of the above-described models is shown in FIG. 10 at 1000. The requirement description 1002 is summarized using the T5 model in column 1004. A MUSS model text simplification output for the same requirement description 1002 is shown in column 1006 for a character length ratio of 0.7. A MUSS model text simplification output for the same requirement description 1002 is shown in column 1008 for a character length ratio of 0.9. A summarization output produced using the BigBird-PEGASUS model is shown at column 1010. Each of the outputs 1004-1010 provide different levels of modification, compression, and lexical and syntactic simplification of the requirement description.

In the system 800, the requirement description output 112 is passed directly to the summarization generator 802, which is configured using one of the models described above, either in a pre-trained form or further fine-tuned on specific regulatory content. The summarization generator 802 generates a summarization output 804. An example of a summarization output presented as a spreadsheet is shown in FIG. 9 at 900. The spreadsheet 900 includes the columns 152-158 shown in FIG. 1C (of which only column 152 and 158 are shown in FIG. 9) and further includes a summarization output column 902. The summarization output column 902 includes a summarized description for each corresponding requirement. In this example, the summarization output column 902 is generated using a MUSS model with a character length ratio of 0.7. The summarization outputs are generally shorter than the requirement description text and are also generally more readable and succinct.

While specific embodiments have been described and illustrated, such embodiments should be considered illustrative only and not as limiting the disclosed embodiments as construed in accordance with the accompanying claims.

What is claimed is:

1. A computer-implemented method for generating regulatory content requirement descriptions, the method comprising:
   receiving requirement data including a plurality of requirements extracted from regulatory content, the requirement data including hierarchical information identifying a hierarchical level of each requirement within the plurality of requirements;
   identifying parent requirements within the plurality of requirements based on the existence of one or more child requirements on a hierarchical level immediately below the parent requirement;
   generating requirement pairs, each pair including one of the parent requirements and at least one of the one or more child requirements on the hierarchical level immediately below the parent requirement;
   feeding each of the requirement pairs through a conjunction classifier, the conjunction classifier having been trained to generate a classification output indicative of the requirement pair being one of:
      not a conjunction (NC) between the parent requirement and the child requirement;
      a single requirement conjunction (CSR) between the parent requirement and the child requirement; or
      a multiple requirement conjunction (CMR) between the parent requirement and the child requirement; and
   generating a set of requirement descriptions based on the classification output generated for each parent requirement.

2. The method of claim 1 wherein generating the requirement pairs comprises generating a single requirement pair for each parent requirement, the single requirement pair including the parent requirement and all of the child requirements on the hierarchical level immediately below the parent requirement.

3. The method of claim 1 wherein generating the requirement pairs comprises generating a plurality of separate requirement pairs for each parent requirement, each separate requirement pair including the parent requirement and one of the one or more child requirements on the hierarchical level immediately below the parent requirement.

4. The method of claim 3 further comprising generating a final classification for each parent requirement based on a combination of the classification outputs for the requirement pairs corresponding to the one or more child requirements on a hierarchical level immediately below the parent requirement.

5. The method of claim 4 wherein generating the final classification for each parent requirement comprises feeding the classification output for each parent requirement through a final classification neural network, the final classification neural network having been trained to generate the final classification based on the combination of the classification outputs for the requirement pairs.

6. The method of claim 4 wherein generating the final classification comprises assigning a final classification to a parent requirement based on the classifications assigned by the conjunction classifier to the requirement pairs associated with the parent requirement on a majority voting basis.

7. The method of claim 4 wherein generating the final classification comprises:
   assigning a CSR classification to the parent requirement when any one of the classification outputs associated with the requirement pairs is assigned a CSR classification;
   if none of the classification outputs associated with the requirement pairs is assigned a CSR classification, assigning a CMR classification to the parent requirement when any one of the classification outputs associated with the requirement pairs is assigned a CMR classification; and
   if none of the classification outputs associated with the requirement pairs is assigned a CSR or CMR classification, assigning a NC classification to the parent requirement.

8. The method of claim 1 wherein generating the set of requirement descriptions comprises:
   for each parent requirement assigned a NC classification, generating a requirement description that includes text associated only with the parent requirement;
   for each parent requirement assigned a CSR classification, generating a single requirement description that concatenates text associated with the parent requirement and each of the one or more child requirements at the hierarchical level below the parent requirement; and
   for each parent requirement assigned a CMR classification, generating a separate requirement description that concatenates text associated with the parent requirement and the text of each of the one or more child requirements at the hierarchical level below the parent requirement.

9. The method of claim 8 further comprising generating a spreadsheet listing the set of requirement descriptions, each requirement description appearing under a requirement description column on a separate row of the spreadsheet, each row further including the associated citation in a citation column.

10. The method of claim 9 wherein generating the spreadsheet listing further comprises:

for a parent requirement that is assigned a final classification of CSR, including the associated single requirement description on a spreadsheet row associated with the parent requirement;

for a parent requirement that is assigned a final classification of CMR:

including the separate requirement description for each of the one or more child requirements on a spreadsheet row associated with the respective child requirement; and leaving the requirement description column for the spreadsheet row associated with parent requirement empty.

11. The method of claim 10 wherein generating the spreadsheet listing further comprises, generating a label column, the label column including:

a requirement label (REQ) for each of:

a parent requirement that is assigned a final classification of CSR a child requirement associated with a parent requirement assigned a final classification of CMR; and a requirement addressed elsewhere (RAE) label for each parent requirement assigned a final classification of CMR.

12. The method of claim 1 wherein receiving the plurality of requirements comprises:

receiving regulatory content and generating a language embedding output representing the regulatory content;

processing the language embedding output to identify citations and associated requirements within the regulatory content; and processing the plurality of citations to determine a hierarchical level for the citation and associated requirement.

13. The method of claim 12 wherein the language embedding is generated using a pre-trained language model, the language model having been fine-tuned using a corpus of unlabeled regulatory content.

14. The method of claim 1 further comprising, prior to generating regulatory content requirement descriptions:

configuring a conjunction classifier neural network to generate the classification output, the conjunction classifier neural network having a plurality of weights and biases set to an initial value;

in a training exercise, feeding a training set of requirement pairs through the conjunction classifier, each requirement pair in the training set having a label indicating whether the pair is a NC, CSR, or CMR requirement pair; and based on the classification output by the conjunction classifier neural network for requirement pairs in the training set, optimizing the plurality of weights and biases to train the neural network for generation of the classification output.

15. The method of claim 1 further comprising generating a plurality of requirement summarizations, each requirement summarization corresponding to one of the requirement descriptions and summarizing a text content of the requirement description.

16. The method of claim 15 wherein generating the plurality of requirement summarizations comprises feeding each of the requirement descriptions through a summarization generator, the summarization generator being implemented using a summarization generator neural network that has been trained to generate a summarization output based on a text input.

17. The method of claim 16 further comprising fine-tuning the summarization generator neural network using a regulatory content dataset including requirement descriptions and corresponding requirement description summaries.

18. The method of claim 17 further comprising training the summarization generator neural network by:

identifying requirements in regulatory content;

generating training data in which the identified requirements are masked while leaving descriptive text, optional requirements, and recommendations unmasked;

training the summarization generator neural network using the training data;

fine-tuning the summarization generator neural network using a regulatory content dataset including requirement descriptions and corresponding requirement description summaries.

19. The method of claim 18 wherein the corresponding requirement description summaries are generated by human review of the regulatory content dataset.

20. The method of claim 17 further comprising training the summarization generator neural network by:

extracting requirements from a plurality of different regulatory content sources to generate a requirement corpus;

generating language embeddings for the requirement sentences in the requirement corpus;

identifying similar requirement sentences within the requirement corpus that meet a similarity threshold based on their respective language embeddings;

for each of the identified similar requirement sentences, generating a control token that is based on attributes of the requirement sentence to generate labeled training samples for training summarization generator neural network.

21. A system for generating regulatory content requirement descriptions, the system comprising:

a parent/child relationship identifier, configured to:

receive requirement data including a plurality of requirements extracted from regulatory content, the requirement data including hierarchical information identifying a hierarchical level of each requirement within the plurality of requirements;

identify parent requirements within the plurality of requirements based on the existence of one or more child requirements on a hierarchical level immediately below the parent requirement;

generate requirement pairs, each pair including one of the parent requirements and at least one of the one or more child requirements on the hierarchical level immediately below the parent requirement;

a conjunction classifier configured to receive each of the requirement pairs, the conjunction classifier having been trained to generate a classification output indicative of the requirement pair being one of:

not a conjunction (NC) between the parent requirement and the child requirement;

a single requirement conjunction (CSR) between the parent requirement and the child requirement; or a multiple requirement conjunction (CMR) between the parent requirement and the child requirement;

a requirement description generator configured to generate a set of requirement descriptions based on the classification output generated for each parent requirement.

22. The system of claim 21 wherein the parent/child relationship identifier is configured to generate the requirement pairs by generating a single requirement pair for each parent requirement, the single requirement pair including the parent requirement and all of the child requirements on the hierarchical level immediately below the parent requirement.

23. The system of claim 21 wherein the parent/child relationship identifier is configured to generate the requirement pairs by generating a plurality of separate requirement pairs for each parent requirement, each separate requirement pair including the parent requirement and one of the one or more child requirements on the hierarchical level immediately below the parent requirement.

24. The system of claim 23 wherein the requirement description generator is configured to generate a final classification for each parent requirement based on a combination of the classification outputs for the requirement pairs corresponding to the one or more child requirements on a hierarchical level immediately below the parent requirement.

25. The system of claim 24 wherein the requirement description generator comprises a final classification neural network, the final classification neural network having been trained to generate the final classification based on the combination of the classification outputs for the requirement pairs.

26. The system of claim 23 wherein the requirement description generator is configured to generate the final classification by:
assigning a CSR classification to the parent requirement when any one of the classification outputs associated with the requirement pairs is assigned a CSR classification;
if none of the classification outputs associated with the requirement pairs is assigned a CSR classification, assigning a CMR classification to the parent requirement when any one of the classification outputs associated with the requirement pairs is assigned a CMR classification; and
if none of the classification outputs associated with the requirement pairs is assigned a CSR or CMR classification, assigning a NC classification to the parent requirement.

27. The system of claim 21 further comprising a summarization generator operably configured to generate a plurality of requirement summarizations, each requirement summarization corresponding to one of the requirement descriptions and summarizing a text content of the requirement description.

28. The system of claim 27 wherein the summarization generator comprises a summarization generator neural network that has been trained to generate a summarization output based on a text input.

29. The system of claim 28 wherein the summarization generator neural network is trained by:
identifying requirements in regulatory content;
generating training data in which the identified requirements are masked while leaving descriptive text, optional requirements, and recommendations unmasked;
training the summarization generator neural network using the training data;
fine-tuning the summarization generator neural network using a regulatory content dataset including requirement descriptions and corresponding requirement description summaries.

30. The system of claim 28 wherein the summarization generator neural network is trained by:
extracting requirements from a plurality of different regulatory content sources to generate a requirement corpus;
generating language embeddings for the requirement sentences in the requirement corpus;
identifying similar requirement sentences within the requirement corpus that meet a similarity threshold based on their respective language embeddings;
for each of the identified similar requirement sentences, generating a control token that is based on attributes of the requirement sentence to generate labeled training samples for training summarization generator neural network.

* * * * *